United States Patent Office 3,414,575
Patented Dec. 3, 1968

3,414,575
ANHYDROUS CRYSTALLINE COMPLEXES OF COBALTOUS SALTS AND NITROGENOUS BASES
Owen L. Stafford and Joseph D. Brubaker, Midland, Mich., assignors to The Dow Chemical Company, Midland, Mich., a corporation of Delaware
No Drawing. Filed Dec. 9, 1964, Ser. No. 417,237
3 Claims. (Cl. 260—270)

ABSTRACT OF THE DISCLOSURE

An anhydrous crystalline cobalt acid salt-nitrogenous base complex compound is prepared by adding the cobaltous acid salt and the nitrogenous base to an inert organic liquid which forms an azeotrope with water and in which the complex is insoluble at room temperature, heating the liquid and distilling out the water-containing azeotrope until the distillation residue is substantially free of water, cooling the resulting solution to crystallize the complex compound and separating the crystalline complex from the liquid. A catalyst for the polymerization of conjugated diolefins is prepared by mixing the above complex with an alkylaluminum halide.

This invention relates to a method for the preparation of anhydrous crystalline complex compounds of cobaltous salts and nitrogenous bases and the use of the complex compounds as catalyst components for the stereospecific polymerization of conjugated diolefins and particularly for the polymerization of butadiene, isoprene and mixtures thereof to polymers having a high content of cis-1,4-structure.

It is known to the art that soluble catalysts based on cobalt compounds may be employed for the preparation of cis-1,4-polybutadienes and of butadiene-isoprene copolymers having essentially cis-1,4 structure. These catalysts are usually prepared by reaction in a hydrocarbon solvent between a dialkylaluminum monohalide and a soluble cobalt compound such as cobalt diacetylacetonate, the $CoCl_2$ pyridine complex and organic cobalt salts.

The cobalt salt-pyridine complex catalyst component is generally prepared by one of two procedures, viz., the addition of the pyridine to a mixture of a cobalt salt such as $CoCl_2$ and anhydrous benzene whereupon after sufficient time is allotted for the complex to form the mixture is combined with an organometallic compound to obtain the catalyst or alternatively the cobalt salt is complexed with pyridine in an inert hydrocarbon solvent and the solution of the complex is separated from the solid metal salt and undissolved complex and is mixed with the organometallic compound to obtain the catalyst.

In each method of preparation described above, it is extremely critical that all reactants be anhydrous for the presence of even very minor amounts of water will poison the effectiveness of the catalyst combination of the cobalt complex and alkyl aluminum compound. The stringent precautions that must be taken to insure anhydrous conditions in the preparation of the cobalt complex e.g. dehydration of the cobalt salt, dehydration of the solvent, exclusion of air in complex formation, are time consuming and costly and affect the commercial feasibility of the catalytic process.

According to the present invention, anhydrous, crystalline complex compounds of a cobaltous acid salt and a nitrogenous base are prepared by adding the cobaltous acid salt and the nitrogenous base to an inert liquid vehicle which forms an azeotrope with water and in which the complex is insoluble at room temperature, heating the vehicle and reaction components to a temperature range between 80° C. and the temperature at which the vehicle forms an azeotropic mixture with water, the complex being soluble in the vehicle at said temperature range, distilling out the water-containing azeotrope until the distillation residue is substantially free of water, cooling the solution to crystallize the cobalt acid salt/nitrogenous base complex and then separating the complex from the vehicle.

A polymerization catalyst composition prepared by mixing the resulting anhydrous, crystalline cobalt acid salt/nitrogenous base complex compound and a monoalkylaluminum dihalide is very efficient for the preparation of polymers from conjugated diolefins having a high percentage of the cis-1,4 structure.

The term "nitrogenous base" as it is used herein refers to and includes pyridine, organic nitrogenous bases of the pyridine type such as alkylated pyridines, quinolines and other nitrogen containing compounds generally, such as the various aliphatic and aromatic amines, diamines, amides, phenyl hydrazines and the like. Examples of cobaltous acid salts which may be reacted with the nitrogenous bases to form the complex salts are cobaltous halides such as cobaltous chloride, cobaltous bromide, cobaltous iodide, cobaltous fluoride, cobaltous sulfate, and cobaltous nitrate.

Liquid vehicles which are particularly useful in preparing the solid complexes of the present invention are inert organic solvents which do not react with the reaction components during the preparation of the complex compounds, form an azeotropic mixture with water and have a solubility parameter of 8.93 or greater. Solubility parameter is defined as the square root of the cohesive energy density of a material. A more detailed discussion of this term is found in Small, J. Appl. Chem., 3, 75 (1953). Solvents which have a solubility parameter of 8.93 or more and form an azeotropic mixture with water include toluene (S.P.=8.93), benzene (S.P.=9.18), o-xylene (S.P.=9.01), chlorobenzene (S.P.=9.50), o-chlorotoluene (S.P.=9.37), o-dichlorobenzene (S.P.=10.21).

The anhydrous crystalline cobalt acid salt/nitrogenous base complex is prepared by adding either the hydrated or non-hydrated salt and the nitrogenous base to the inert liquid vehicle and heating the vehicle to a temperature at which the vehicle forms an azeotropic mixture with water. Water that is given off as a by-product as the hydrated cobaltous salt is complexed with the nitrogenous base or in some other manner is present in the reactants, is removed as an azeotropic mixture with the reaction vehicle and the ceasing of its evolution is a convenient determinant of the end of the reaction or the dryness of the system when non-hydrated cobaltous salts are used.

The reaction is conducted at elevated temperatures ranging from about 80° C. to as high as the boiling point of the reactants. If the temperature is less than 80° C., the water is not removed from the reaction mixture and the complexing reaction is incomplete. After complete removal of the effluent water, the reaction vehicle is allowed to cool slowly to room temperature whereupon the complex crystallizes out as an anhydrous solid material, and in which state the complex is separated from the solvent. As a general rule, it is desirable that the crystallization of the cobaltous acid salt/nitrogenous base complex be conducted in the absence of air, as the crystalline product is usually hygroscopic and the water is a poison for catalysts having alkylaluminum dichlorides as a component. One exception to this general rule is the complex which is formed from the reaction of cobaltous chloride and pyridine according to the above described procedure wherein the crystalline complex is non-hydroscopic and the usual precautions necessary to exclude air are not required.

In preparing the cobalt acid salt/nitrogenous base complexes according to the present invention, the molar ratios of the cobalt salt to nitrogenous base used in preparing the solution can vary. For example, when cobaltous chloride and pyridine are used, the molar ratios may vary from 1:1 to 1:4. Higher molar ratios are not detrimental, as the crystalline complex is separated from the solution used to prepare it and the problem of having excess pyridine, which may be detrimental to the polymerization reaction using alkylaluminum dihalides as catalyst components, is thereby avoided.

The catalyst composition of the present invention comprised of the solid, anhydrous crystalline cobalt acid salt/ nitrogenous base complex and the monoalkylaluminum dihalide may be employed for the polymerization of any conjugated diolefin. It is preferred to employ a conjugated diolefin containing from 4 to 8 carbon atoms per molecule. It is particularly useful for the polymerization of 1,3-butadiene. The term "conjugated diolefin" includes aliphatic or cycloaliphatic compounds having at least two polymerizable ethylenic double bonds which together form a conjugated system as well as the aryl substituted derivatives of such compounds. Examples of conjugated alkadienes in addition to 1,3-butadiene are isoprene; piperylene; chloroprene; 2,3-dimethylbutadiene; 4-methylpentadiene; 2 - isopropylbutadiene - 1,3; octatriene-2,4,6; cyclopentadiene; cyclohexadiene - 1,3; 2,3-diphenylbutadiene-1,3 and the like. Mixtures of one or more conjugated dienes in any desired proportions may be copolymerized with one or more other compounds containing an active vinyl or vinylidene group, i.e., an ethylenically unsaturated compound, such as the α-olefins, ethylene, propylene, isobutylene, 1-octene and the like, as well as diolefins, styrene, methyl methacrylate, acrylonitrile, vinyl chloride and the like. Of particular importance are the copolymers of 1,3-butadiene and styrene containing from about 5 to about 60 percent by weight styrene.

The polymerization process of this invention is usually carried out in the presence of a diluent, vehicle or solvent. The diluent preferably consists substantially of saturated aliphatic, cycloaliphatic or aromatic hydrocarbons or mixtures thereof. The aromatic hydrocarbons are particularly preferred. Examples of straight and branched chain paraffins containing up to and including 10 carbon atoms which may be used include propane, n-butane, n-pentane, isopentane, n-hexane, isohexane, isooctane and n-decane. Illustrative of cycloaliphatics are cyclohexane and methyl cyclohexane. Benzene, toluene, xylene and ethylbenzene are suitable aromatic hydrocarbons. It is to be understood that mixtures of any of the above may also be employed. The diluent is usually used in an amount of from 1 to 10 times the volume of monomer although these limits are merely exemplary and not particularly critical. It is preferred to treat the diluent prior to the use to remove any traces of water which might be present, as by passing the same through a molecular sieve column.

The catalyst composition may be easily prepared by adding the solid crystalline cobalt acid salt/nitrogenous base complex to the diluent in the reaction zone to form a solution or dispersion of the complex and thereafter adding the monoalkylaluminum dihalide and monomer to the system to initiate the polymerization reaction. The mole ratio of monoalkylaluminum dichloride to cobaltous acid salt can be from 1.0 to 10.0 or higher. The proportion of active catalyst components to diluent can be from about 2 millimole per liter to about 20 millimole per liter or more.

Suitable monoalkylaluminum dihalides useful in preparing the catalyst compositions of the present invention include the lower alkylaluminum dichlorides and dibromides wherein the alkyl group contains from 1 to 10 carbon atoms such as methylaluminum dichloride, methylaluminum dibromide, ethylaluminum dichloride, ethylaluminum dibromide, propylaluminum dichloride, isopropylaluminum dichloride, butylaluminum dichloride, isobutylaluminum dichloride and the like. Particularly good results are obtained with ethylaluminum dichloride.

The polymerization reaction using the catalyst composition of the present invention is carried out in either batch or continuous fashion by combining diluent, monomer and catalyst in any convenient order and maintaining the resulting mixture under an inert atmosphere at a temperature of from about 0° C., to about 150° C., more preferably from 20° C. to 100° C., until the polymerization reaction has proceeded to the desired extent. Reaction times of 20 to 30 minutes at temperatures around 70° C., give satisfactory yield of polymer. At other temperatures, the reaction time may vary from about 0.1 to about 3 hours.

The amounts of diluent, monomer and catalyst used may vary over a wide range depending on the exact nature of each constitutent. The concentration of total catalyst composition, i.e., cobaltous acid salt/nitrogenous complex plus monoalkylaluminum dihalide is usually about 0.1 percent to 1.0 percent by weight or higher based on the quantity of monomer employed. As polymerization progresses, the polymer that is formed remains dissolved or dispersed in the diluent and the fluid system becomes increasingly viscous. A sufficient quantity of diluent is employed to insure that the final reaction product is not to viscous to be removed conveniently from the reactor. Generally, concentrations of solvent of about 100 percent, or greater by weight based on the quantity of monomer employed yields a desirable product. Another approach is to use a minimum amount of diluent, about 10 percent to 100 percent by weight of the monomer, stop the reaction before complete conversion of monomer to polymer has taken place, remove the reactants from the reactor, and separate and recycle any unreacted monomer. The inert atmosphere may be supplied by nitrogen, hydrocarbon vapor, argon or other inert gas or the like and should be maintained at least until after the catalyst has been deactivated. Mild agitation is preferred during the course of the reaction to insure formation of a more uniform product. Such agitation may be achieved by mounting the reactor on a rocker or by the use of suitable stirrers in the reactor.

At the end of the polymerization step, the polymer may be recovered by any one of several well-known procedures. The metal catalyst is generally deactivated or "killed" by the addition to the polymerization reaction product of a liquid active hydrogen-containing compound, such as water, acid, ketone, alcohol, glycol and the like. Such active hydrogen-containing compounds remove catalyst residues from the polymer solution and generally cause precipitation or coagulation of the previously dissolved polymer. The polymer may be separated from the mixture of unreacted monomer, diluent, catalyst residues and treating agent by decantation, filtration, centrifugation, steam stripping, spray drying devolatilization or any other well-known procedure. Polymers thus produced have a high percentage, i.e., 75 percent or more, cis-1,4 structure with the remainder being a mixture of trans-1,4 and 1,2 structures.

The practice of the invention is described in more detail in the following example which is intended to be illustrative only and not to unduly limit the invention.

Example.—Preparation of Anhydrous Crystalline
$CoCl_2 \cdot 2\ (C_5H_5N)$

Into a one-liter, round-bottomed distillation flask was placed 9.6 g. (40 millimoles) of finely ground $CoCl_2 \cdot 6H_2O$ Chlorobenzene (20 milliliters) and 12.8 milliliters (160 millimoles) of pyridine were added and the contents swirled until the initial warming effect had subsided. Additional chlorobenzene (500 milliliters) was added and the flask was fitted with an 18 inch, vacuum-jacketed distillation column packed with Berl saddles (possessing a maximum of 5 theoretical plates). About 25 milliliters of distillate containing chlorobenzene, pyridine and water was removed until the head temperature was about 131° C. The contents of the flask were poured (without cooling) into an oven-dried, warm crystallizing dish, covered with aluminum foil and allowed to cool to room temperature overnight. The mother-liquor was decanted and the violet colored, needle-like crystals washed with hexane and air-dried. The dried needles (11.7 grams) had the following analysis:

Calculated for $CoCl_2 \cdot 2(C_5H_5N)$: Co, 20.45%; Cl, 24.60%; N, 9.70%; O, 0.00%. Found [1]: Co, 22.6%; Cl, 25.9%; N, 10.2%; O, 0.03%.

Polymerization of butadiene using anhydrous, crystalline $CoCl_2 \cdot 2(C_5H_5N)$ as a catalyst component To a dry citrate bottle containing 150 milliliters of dry toluene (inside a nitrogen-atmosphere glove box) was added 0.25 millimole of the $CoCl_2 \cdot 2(C_5H_5N)$ complex. After most of the complex was in solution, 2.0 millimoles of ethylaluminum dichloride was added, the bottle was sealed with a neoprene rubber stopper and removed from the glove-box. After capping the bottle with a metal cap containing a hole large enough to allow the insertion of a hypodermic needle, purified butadiene vapor (15-20 grams) was introduced at room temperature. After thirty minutes, 14.5 grams of polybutadiene was isolated. The polymer microstructure was analyzed by infrared absorption curves which indicated the following structure:

| | Percent |
|---|---|
| Cis-1,4 | 90.7 |
| Trans-1,4 | 6.7 |
| 1,2 | 2.6 |

In a similar manner, other cobaltous acid salts may be reacted with equivalent amounts of the other nitrogenous bases mentioned above to prepare anhydrous, crystalline complex salts which may be mixed with the other monoalkylaluminum dihalides mentioned above to prepare catalyst compositions which are suitable for the stereospecific polymerization of conjugated dienes.

What is claimed is:
1. A method for the preparation of anhydrous, crystalline complex compounds of a cobaltous acid salt and pyridine which comprises adding the cobaltous acid salt and the pyridine to an inert organic liquid which forms and azeotrope with water and in which the complex is insoluble at room temperature, heating the liquid to a temperature range between 80° C. and the temperature at which the liquid forms an azeotropic mixture with water, the complex being soluble in the liquid at said temperature range and forming a solution therein, distilling out the water-containing azeotrope until the distillation residue is substantially free of water, cooling the resulting solution to crystallize the complex compound and separating the crystalline complex compound from the liquid.

2. The method of claim 1 wherein the liquid is chlorobenzene.

3. The method of claim 1 wherein the cobaltous acid salt is cobaltous chloride.

References Cited
UNITED STATES PATENTS

| | | | |
|---|---|---|---|
| 3,016,371 | 1/1962 | Natta et al. | 260—94.3 |
| 3,068,180 | 12/1962 | Van Amerongen et al. | 260—94.3 |
| 3,094,514 | 6/1963 | Tucker | 260—94.3 |
| 3,135,725 | 6/1964 | Carlson et al. | 260—94.3 |
| 3,182,051 | 5/1965 | Marullo et al. | 260—94.3 |
| 3,220,999 | 11/1965 | Duck et al. | 260—94.3 |
| 3,284,431 | 11/1966 | Gippin | 260—94.3 |

JOSEPH L. SCHOFER, *Primary Examiner.*

M. B. KURTZMAN, *Assistant Examiner.*

---
[1] By neutron activation analysis.